(12) United States Patent
Nakasawa et al.

(10) Patent No.: US 11,398,659 B2
(45) Date of Patent: Jul. 26, 2022

(54) BATTERY BLOCK

(71) Applicant: Panasonic Intellectual Property Management Co., Ltd., Osaka (JP)

(72) Inventors: Nobuyuki Nakasawa, Osaka (JP); Takeshi Enomoto, Osaka (JP); Takashi Hasegawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/141,854

(22) Filed: Jan. 5, 2021

(65) Prior Publication Data

US 2021/0126316 A1 Apr. 29, 2021

Related U.S. Application Data

(63) Continuation of application No. 16/307,510, filed as application No. PCT/JP2017/021583 on Jun. 12, 2017, now Pat. No. 10,916,744.

(30) Foreign Application Priority Data

Jun. 29, 2016 (JP) .............................. JP2016-129166

(51) Int. Cl.
*H01M 50/20* (2021.01)
*H01M 50/213* (2021.01)
*H01M 50/30* (2021.01)
*H01M 50/50* (2021.01)
(Continued)

(52) U.S. Cl.
CPC ......... *H01M 50/213* (2021.01); *H01M 50/20* (2021.01); *H01M 50/30* (2021.01);
(Continued)

(58) Field of Classification Search
CPC .... H01M 50/213; H01M 50/50; H01M 50/30; H01M 50/502; H01M 50/3425; H01M 50/20; H01M 50/342
See application file for complete search history.

(56) References Cited

U.S. PATENT DOCUMENTS

2010/0015512 A1 1/2010 Inoue et al.
2013/0337299 A1* 12/2013 Sugawara ........... H01M 50/572
429/61

(Continued)

FOREIGN PATENT DOCUMENTS

CN 101740802 A 6/2010
CN 103460437 A 12/2013
(Continued)

OTHER PUBLICATIONS

International Search Report of PCT application No. PCT/JP2017/021583 dated Sep. 12, 2017.
(Continued)

*Primary Examiner* — Olatunji A Godo
(74) *Attorney, Agent, or Firm* — .McDermott Will & Emery LLP (57) ABSTRACT

A battery block includes a plurality of cylindrical batteries, a battery holder having a plurality of accommodating parts into which axial one end portions of the cylindrical batteries are inserted, and a pair of terminal plates, that connect the cylindrical batteries in parallel. Each of the accommodating parts includes the partition wall formed along an outer peripheral surface of cylindrical battery, an extending portion that extends on the first end surface so as to surround a part of the first end surface on which the safety valve is disposed and is formed integrally with the partition wall, and an opening that exposes the part of the first end surface on which the safety valve is disposed.

3 Claims, 7 Drawing Sheets

(51) Int. Cl.
  *H01M 50/342* (2021.01)
  *H01M 50/502* (2021.01)
(52) U.S. Cl.
  CPC ..... *H01M 50/342* (2021.01); *H01M 50/3425* (2021.01); *H01M 50/50* (2021.01); *H01M 50/502* (2021.01); *H01M 2200/00* (2013.01); *H01M 2200/20* (2013.01)

(56) References Cited

U.S. PATENT DOCUMENTS

| | | |
|---|---|---|
| 2014/0017531 A1 | 1/2014 | Uehara et al. |
| 2015/0014603 A1 | 1/2015 | Yoshihara et al. |
| 2016/0049626 A1 | 2/2016 | Yasui et al. |
| 2016/0141573 A1 | 5/2016 | Aoki et al. |

FOREIGN PATENT DOCUMENTS

| | | |
|---|---|---|
| EP | 2187473 A1 | 5/2010 |
| JP | 2008-204990 A | 9/2008 |
| JP | 2010-282811 A | 12/2010 |
| JP | 2012-009389 A | 1/2012 |
| JP | 5330810 B2 | 10/2013 |
| JP | 2014-160551 A | 9/2014 |
| WO | 2012/132135 A1 | 10/2012 |
| WO | 2013/133181 A1 | 9/2013 |
| WO | 2014/156001 A1 | 10/2014 |
| WO | 2014/156022 A1 | 10/2014 |

OTHER PUBLICATIONS

Non-Final Office Action issued in U.S. Appl. No. 16/307,510, dated May 14, 2020.
Notice of Allowance issuedin U.S. Appl. No. 167307,510, dated Oct. 2, 2020.
Corrected Notice of Allowance issued in U.S. Appl. No. 16/307,510, dated Oct. 26, 2020.
English Translation of Chinese Office Action dated Apr. 1, 2021 for the related Chinese Patent Application No. 201780039519.2.

* cited by examiner

BATTERY BLOCK

CROSS-REFERENCE TO RELATED APPLICATIONS

This application is a Continuation of U.S. patent application Ser. No. 16/307,510, filed on Dec. 6, 2018, which is a U.S. national stage application of the PCT International Application No. PCT/JP2017/021583 filed on Jun. 12, 2017, which claims the benefit of foreign priority of Japanese patent application 2016-129166 filed on Jun. 29, 2016, the contents all of which are incorporated herein by reference.

TECHNICAL FIELD

The present disclosure relates to a battery block.

BACKGROUND ART

PTL 1 discloses a battery module that includes a plurality of battery blocks serially connected to each other and a case that accommodates the battery blocks. The battery block disclosed in PTL 1 includes a metallic battery holder in which a plurality of battery accommodating parts passing through the metallic battery holder in a cylindrical shape are formed and a pair of terminal plates for connecting a plurality of cylindrical batteries accommodated in the metallic battery holder in parallel.

When the metallic holder is used, an insulating plate must be disposed between the terminal plate and the holder, and thus a large gap is formed between the terminal plate and the holder. In addition, each battery accommodating part is formed to pass through the holder in an axial direction of a battery in a slightly larger size than a diameter of the battery. A gap that enables gas to axially flow is thus formed between the holder and the battery. For this reason, if abnormality occurs in one battery and high-temperature gas is discharged from that battery, a part of the gas easily flows into other battery accommodating parts and other normal batteries may be exposed to high temperature.

CITATION LIST

Patent Literature

PTL 1: Unexamined Japanese Patent Publication No. 2014-160551

SUMMARY OF THE INVENTION

In a battery block in which a plurality of cylindrical batteries are incorporated, when abnormality occurs in one cylindrical battery and high-temperature gas is discharged from that battery, it is important to reduce influence on other batteries. It is thought that, the battery block disclosed in PTL 1 solves such a problem by, for example, applying an adhesive between an insulating plate and a cylindrical battery so as to surround a safety valve of the battery for the purpose of filling a gap. However, it is desirable to have a simpler and more reliable method.

A battery block according to an aspect of the present disclosure includes: a plurality of cylindrical batteries; a battery holder that is made of a curable resin and has a plurality of accommodating parts into which axial one end portions of the cylindrical batteries are inserted; and a pair of terminal plates that are attached on the battery holder so as to be brought into close contact with the battery holder and connect the cylindrical batteries in parallel. A safety valve is disposed on a first end surface on a side of the axial one end portion of each of the cylindrical batteries. Each of the accommodating parts includes: a partition wall that is formed along an outer peripheral surface of each of the cylindrical batteries; an extending portion that extends on the first end surface so as to surround a part of the first end surface on which the safety valve is disposed and that is formed integrally with the partition wall; and an opening that exposes the part of the first end surface on which the safety valve is disposed.

According to a battery block of one aspect of the present disclosure, when abnormality occurs in one cylindrical battery and high-temperature gas is discharged from that battery, it is possible to sufficiently reduce influence on other batteries.

DESCRIPTION OF EMBODIMENT

As described above, in a battery block in which a plurality of cylindrical batteries are incorporated, when abnormality occurs in one cylindrical battery, it is important to reduce influence on other normal batteries. To solve such a problem, a battery block according to an aspect of the present disclosure includes a battery holder made of a curable resin and a pair of terminal plates attached on the battery holder so as to be brought into close contact with the battery holder. The battery holder is made of a resin, and thus it is not necessary to provide an insulating plate between the terminal plate and the holder, and the terminal plates can be brought into close contact with the battery holder. That is, no large gap for enabling gas to be blown is formed between the terminal plate and the holder.

In addition, the battery holder surrounds an axial end portion of each cylindrical battery at least on a side that a safety valve is disposed. Consequently, when high-temperature gas is discharged from a cylindrical battery, the high-temperature gas hardly flows into the holder and is not blown between cylindrical batteries. Moreover, the battery holder is composed of a curable resin, and thus hardly melts if a cylindrical battery abnormally generates heat and the shape of the holder is kept. As described above, according to the battery block of the aspect of the present disclosure, if high-temperature gas is discharged from one cylindrical battery, it is possible to sufficiently reduce influence on other batteries.

An example of an exemplary embodiment is described in detail below. A battery block according to the present disclosure is not limited to the exemplary embodiment described below. Drawings referred to in a description of the exemplary embodiment are schematically drawn, and thus dimensions of configuration elements illustrated in the drawings should be understood in view of the following description.

Hereinafter, for convenience of explanation, a direction along a column of cylindrical batteries is referred to as a "longitudinal direction" of a battery block or the like, and a direction that columns of cylindrical batteries are arranged is referred to as a "horizontal direction" of a battery block or the like. A direction along an axial direction of a cylindrical battery is referred to as a "vertical direction" of a battery block or the like, a side of a positive-electrode current collector plate is referred to as "upper", and a side of a negative-electrode current collector plate is referred to as "lower". In addition, one side (a front side) of a battery block in the longitudinal direction in which a recess for accommodating a positive-electrode-side bus bar is formed is referred to as "front". Another side (a rear side) of a battery block in the longitudinal direction in which a recess for accommodating a negative-electrode-side bus bar is formed is referred to as "rear".

Figure 1:
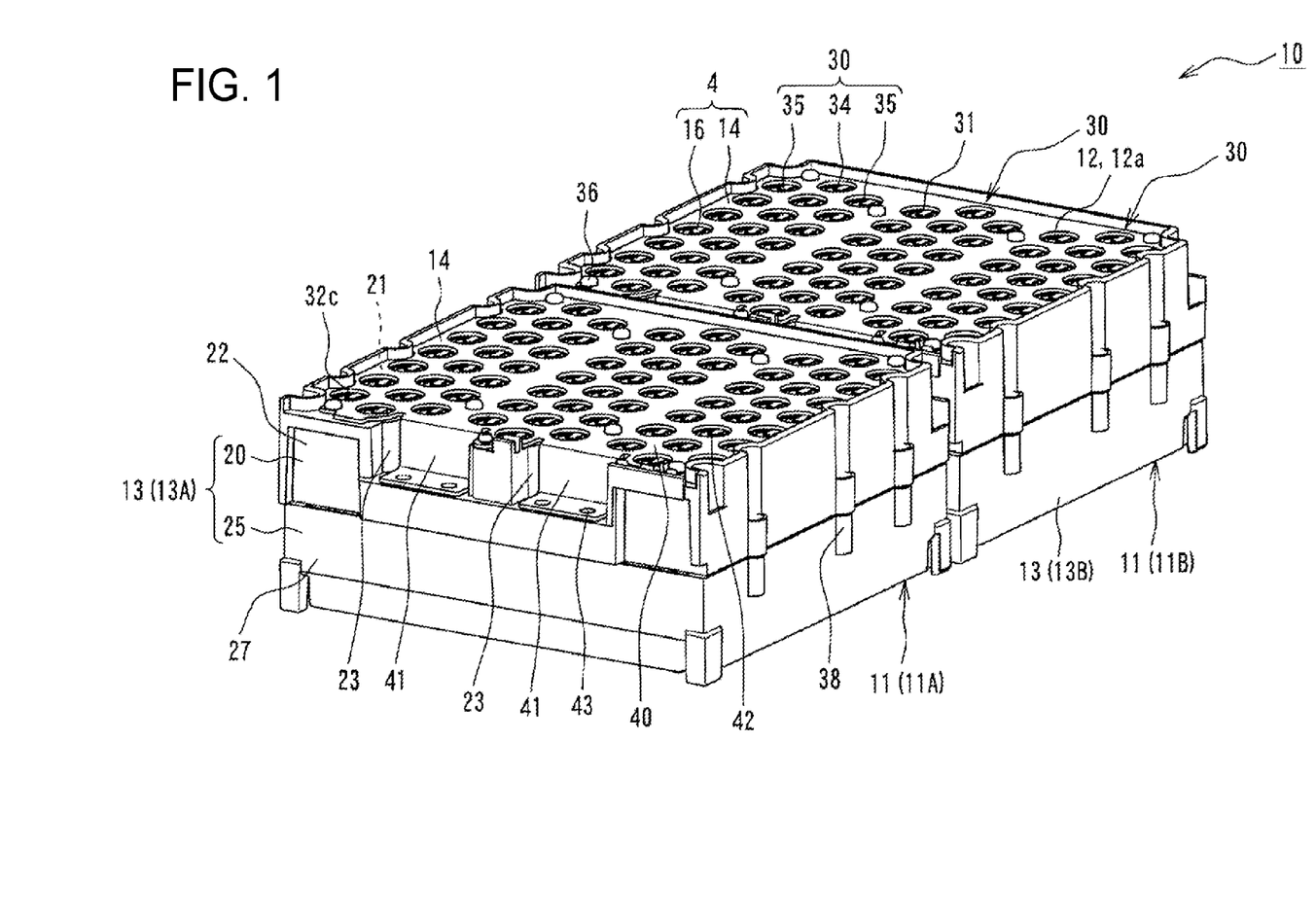
FIG. 1 is a perspective view of a battery block and a battery module according to an example of an exemplary embodiment, as viewed obliquely from above on a front side.
Figure 2:
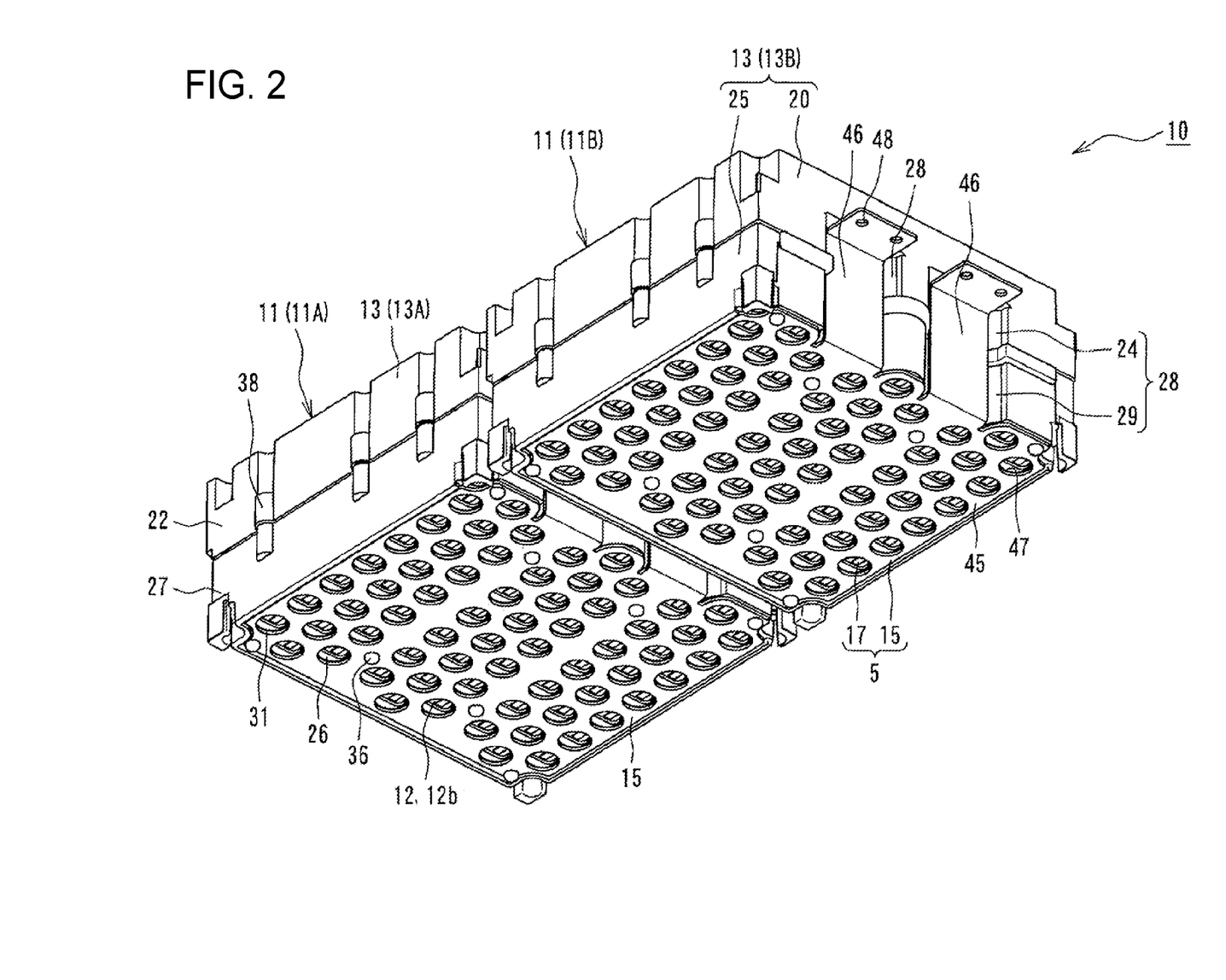
FIG. 2 is a perspective view of the battery block and the battery module according to the example of the exemplary embodiment, as viewed obliquely from below on a rear side.
Figure 3:
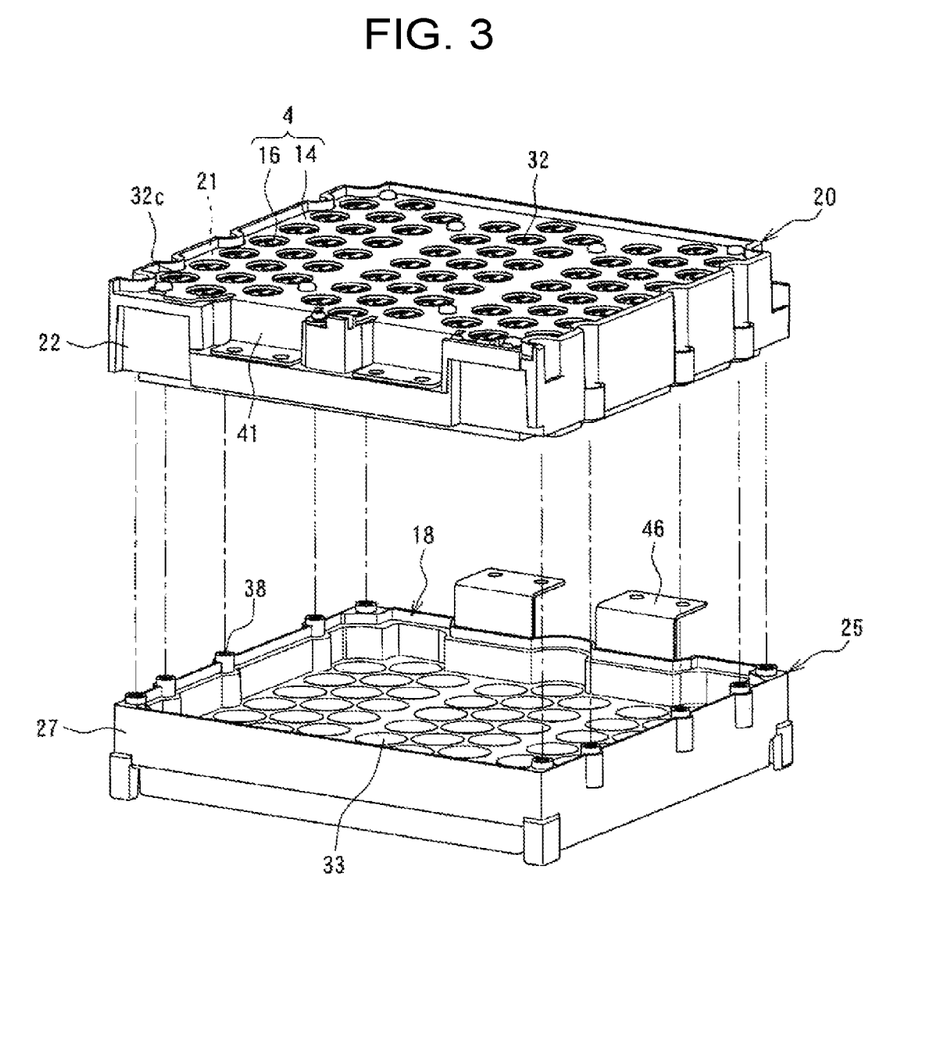
FIG. 3 is an exploded perspective view of the battery block according to the example of the exemplary embodiment.
Figure 4:
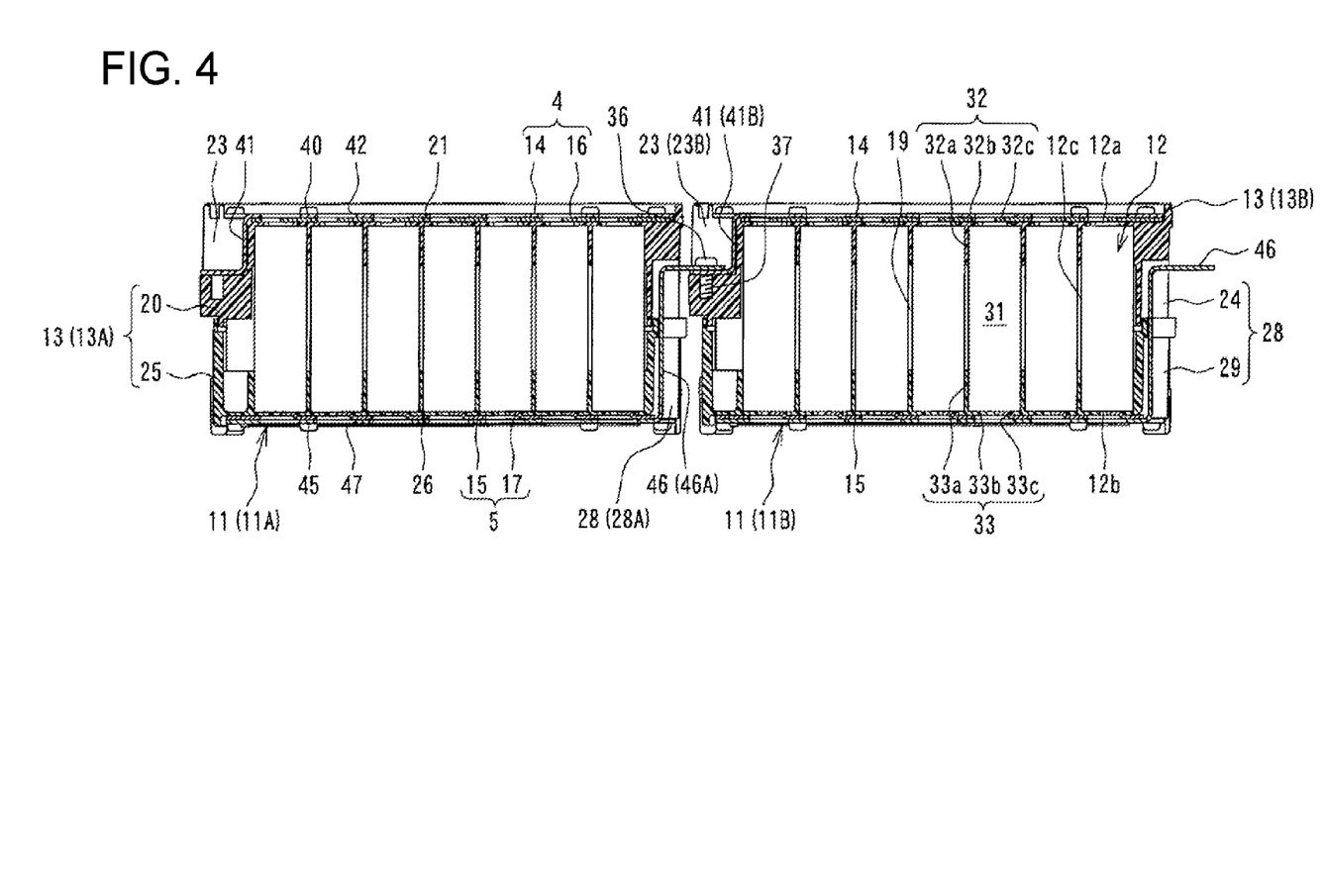
FIG. 4 is a longitudinal cross-sectional view of the battery block and the battery module according to the example of the exemplary embodiment.
Figure 5:
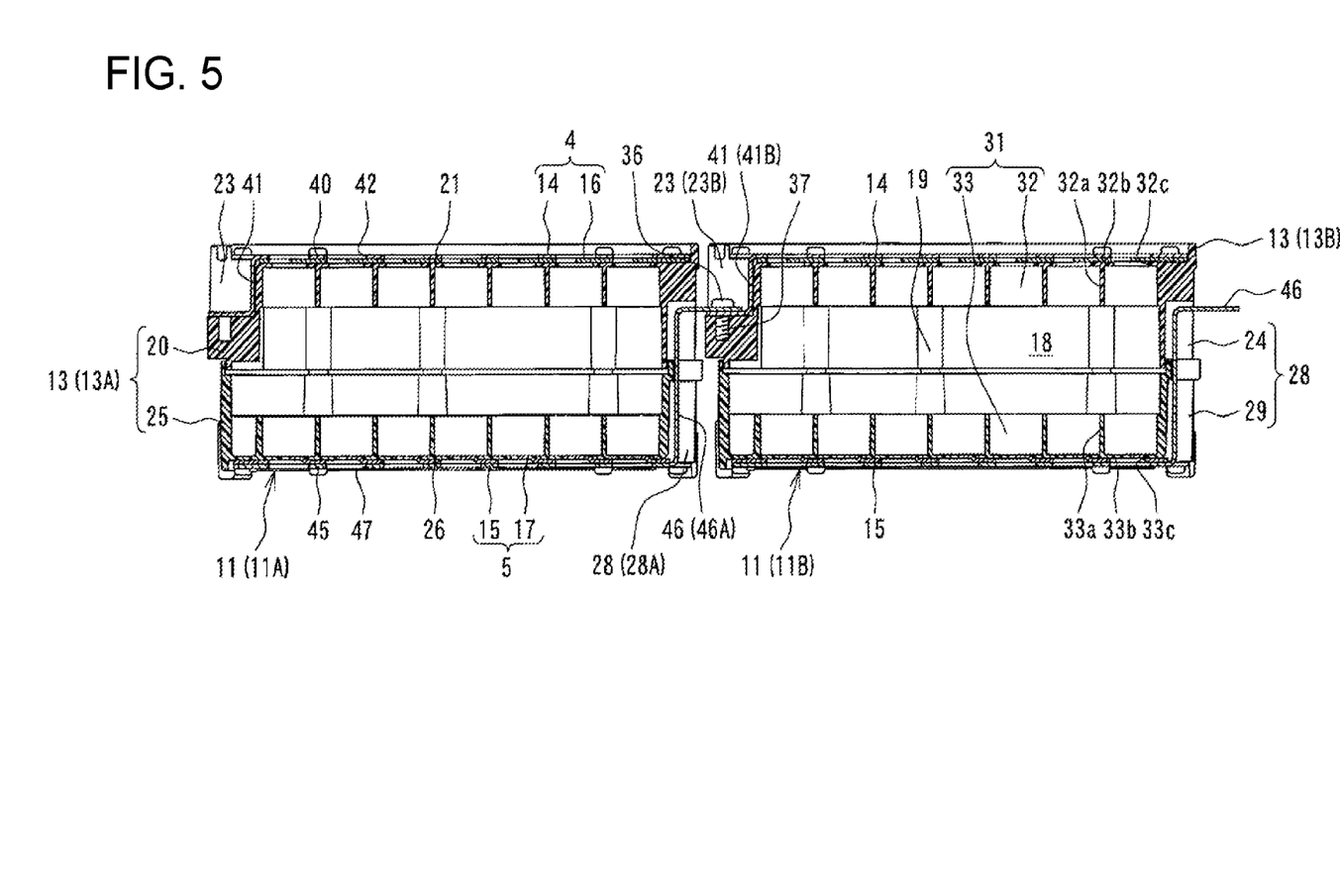
FIG. 5 shows a state of FIG. 4 where cylindrical batteries are removed.

FIGS. 1 and 2 are perspective views of battery module 10 configured by electrically connecting two battery blocks 11 according to the example of the exemplary embodiment. FIG. 3 is an exploded perspective view of battery block 11 (cylindrical batteries are not shown). FIG. 4 is a longitudinal cross-sectional view of battery module 10 and FIG. 5 shows a state of FIG. 4 where cylindrical batteries 12 are removed.

As exemplified in FIGS. 1 to 5, battery block 11 constituting battery module 10 includes a plurality of cylindrical batteries 12 and battery holder 13 that is composed of a curable resin and has a plurality of accommodating parts 32 (see FIGS. 4 and 5) into each of which an axial one end portion (an upper end portion) of each cylindrical battery 12 is inserted. Battery block 11 also includes a pair of terminal plates 4, 5 that are attached on battery holder 13 so as to be brought into close contact with battery holder 13 and connect cylindrical batteries 12 in parallel. Safety valve 50 (see FIG. 6 to be described later) is disposed on first end surface 12a on a side of an axial end (an upper end side) of each cylindrical battery 12.

In the present exemplary embodiment, battery holder 13 is configured by coupling upper holder 20 (first holder) that holds an upper end portion of each cylindrical battery 12 to lower holder 25 (second holder) that holds an axial other end portion (a lower end portion) of each cylindrical battery 12 by screwing at a plurality of portions on a periphery of battery holder 13. An edge that enters an inside of lower holder 25 is formed in a coupling portion of upper holder 20 to lower holder 25. A coupling portion of lower holder 25 to upper holder 20 is made thin so that the edge of upper holder 20 is inserted. Upper holder 20 is thus fitted into lower holder 25 and coupled to lower holder 25 without any gaps between the coupling portions.

Battery module 10 is configured by serially connecting two battery blocks 11 arranged in a longitudinal direction along a column of cylindrical batteries 12. For example, two battery blocks 11 are identical, and have a same shape and size and a same number of cylindrical batteries 12 incorporated. Hereinafter, for convenience of explanation, one battery block 11 is referred to as "battery block 11A (first battery block)" and another battery block 11 is referred to as "battery block 11B (second battery block)". In battery module 10, a rear surface of battery block 11A is disposed to be opposite to a front surface of battery block 11B. A side wall of battery holder 13A that forms the rear surface of battery block 11A and a side wall of battery holder 13B that forms the front surface of battery block 11B may be brought into contact with each other, but in the present exemplary embodiment, are slightly spaced apart from each other in view of tolerances on components.

Battery block 11 is an assembled battery unit in which cylindrical batteries 12 accommodated in battery holder 13 are connected in parallel to each other by terminal plates 4, 5. Terminal plate 4 is a positive-electrode terminal plate connected to a positive electrode terminal of each cylindrical battery 12. Terminal plate 5 is a negative-electrode terminal plate connected to a negative electrode terminal of each cylindrical battery 12, and is disposed to be opposite to terminal plate 4 with each cylindrical battery 12 being provided between terminal plate 5 and terminal plate 4. Terminal plate 4 is constituted by positive-electrode current collector plate 14 and positive-electrode lead plate 16 that is a positive electrode lead abutting against the positive electrode terminal of each cylindrical battery 12. Terminal plate 5 is constituted by negative-electrode current collector plate 15 and negative-electrode lead plate 17 that is a negative electrode lead abutting against the negative electrode terminal of each cylindrical battery 12. Battery module 10 is configured by connecting negative-electrode current collector plate 15A of battery block 11A to positive-electrode current collector plate 14B of battery block 11B. Battery module 10 may be configured by electrically connecting three or more battery blocks 11.

Terminal plate 4 is attached on upper holder 20. Positive-electrode current collector plate 14 of terminal plate 4 has base 40 in which a plurality of openings 42 are formed and bus bar 41 extending from a longitudinal one end portion (a front end portion) of base 40. Opening 42 is formed at a position overlapping opening 32c formed in upper wall 21 of upper holder 20, which is described later. Bus bar 41 is bent downward at its base portion at a boundary between bus bar 41 and base 40, and then bent forward halfway. Two bus bars 41 that have a same shape and size are formed in positive-electrode current collector plate 14.

Terminal plate 5 is attached on lower holder 25. Negative-electrode current collector plate 15 of terminal plate 5 has base 45 in which a plurality of openings 47 are formed and bus bar 46 extending from a longitudinal other end portion (a rear end portion) of base 45. Opening 47 is formed at a position overlapping opening 33c formed in lower wall 26 of lower holder 25, which is described later. Bus bar 46 is bent upward at its base portion at a boundary between bus bar 46 and base 45 and then bent rearward halfway. Two bus bars 46 that have the same shape and size are formed in negative-electrode current collector plate 15.

Positive-electrode lead plate 16 of terminal plate 4 is interposed between upper wall 21 of upper holder 20 and positive-electrode current collector plate 14 and is electrically connected to the positive electrode terminal of each cylindrical battery 12. Negative-electrode lead plate 17 of terminal plate 5 is interposed between lower wall 26 of lower holder 25 and negative-electrode current collector plate 15 and is electrically connected to the negative electrode terminal of each cylindrical battery 12. Positive-electrode lead plate 16 is bonded to a rear surface of base 40 of positive-electrode current collector plate 14, and negative-electrode lead plate 17 is bonded to a rear surface of base 45 of negative-electrode current collector plate 15, thus being integrated with the respective current collector plates.

An example of a configuration of cylindrical battery 12 is described with reference to a cross-sectional view of FIG. 6. As exemplified in FIG. 6, cylindrical battery 12 includes wound electrode assembly 54 formed by winding positive electrode 51 and negative electrode 52 with separator 53 being provided between positive electrode 51 and negative electrode 52, a non-aqueous electrolyte (not shown), and case 55 that accommodates these components. Case 55 is configured by case main body 56 formed in a substantially cylindrical shape with a bottom and sealing body 57 closing an opening of case main body 56. Case 55 includes first end surface 12a formed in a circular shape in a planar view, second end surface 12b formed in a circular shape in a bottom view, and outer peripheral surface 12c that is a curved surface axially extending. Case 55 has a substantially cylindrical shape that is longer in the axial direction than in a radial direction.

Cylindrical battery 12 includes insulating plates 59, 60 disposed on a top and bottom of electrode assembly 54. In an example of FIG. 6, positive electrode tab 61 attached to positive electrode 51 extends through a through-hole in insulating plate 59 toward sealing body 57. Negative electrode tab 62 attached to negative electrode 52 passes outside of insulating plate 60 to extend toward a bottom of case main body 56. Positive electrode tab 61 is connected to a lower surface of filter 63 that is a bottom plate of sealing body 57 by welding or the like, and cap 64 that is a top panel of sealing body 57 electrically connected to filter 63 is a positive electrode terminal. Negative electrode tab 62 is connected to an inner surface of the bottom of case main body 56 by welding or the like, and case main body 56 is a negative electrode terminal.

Figure 6:
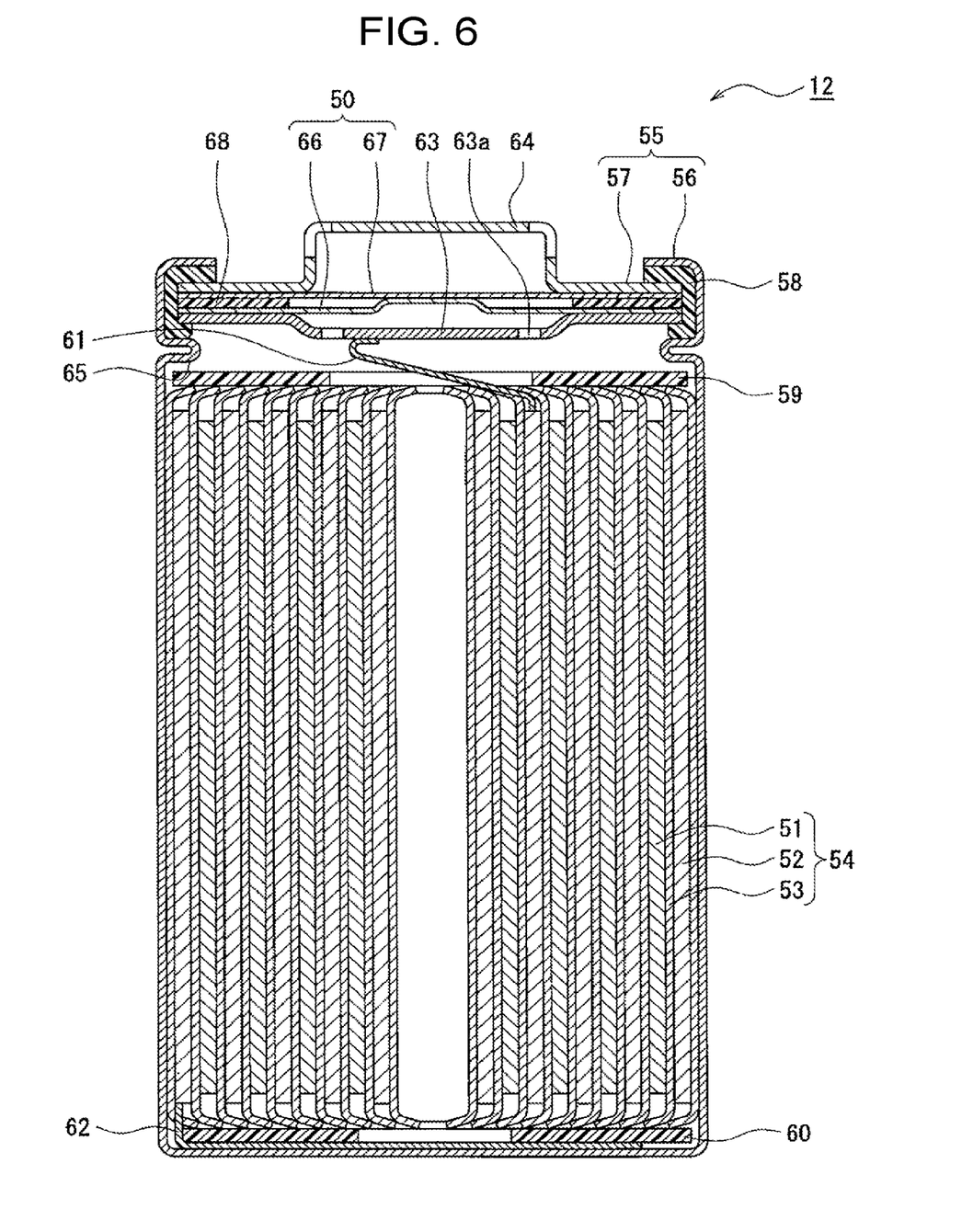
FIG. 6 is a cross-sectional view of a cylindrical battery according to the example of the exemplary embodiment.

In the example of FIG. 6, sealing body 57, which is the positive electrode terminal, forms first end surface 12a on an upper end side of cylindrical battery 12 whereas the bottom of case main body 56, which is the negative electrode terminal, forms second end surface 12b on an axial other end side (a lower end side) of cylindrical battery 12. In the present exemplary embodiment, positive-electrode lead plate 16 is connected to first end surface 12a and negative-electrode lead plate 17 is connected to second end surface 12b. Safety valve 50 is disposed on sealing body 57, as described later. A safety valve may be disposed on the bottom of case main body 56.

Case main body 56 is a metallic container formed in a substantially cylindrical shape with a bottom. Gasket 58 is disposed between case main body 56 and sealing body 57 to achieve sealability of case 55. Case main body 56 includes extending portion 65 formed by, for example, pressing outer peripheral surface 12c from outside for the purpose of supporting sealing body 57. Extending portion 65 is preferably formed annularly along a peripheral direction of case main body 56 and supports sealing body 57 on its upper surface.

Sealing body 57 is a substantially disc-shaped member with a layered structure, and includes safety valve 50 disposed on filter 63, which is the bottom plate. Safety valve 50 closes opening 63a in filter 63, and breaks when internal pressure of a battery is increased by heat generation due to an internal short-circuit or the like. Safety valve 50 includes lower valve body 66 and upper valve body 67 and insulating member 68 is interposed between lower valve body 66 and upper valve body 67. In sealing body 57, filter 63 is bonded to lower valve body 66 at peripheral edges whereas upper valve body 67 is bonded to cap 64 at peripheral edges. Lower valve body 66 is connected to upper valve body 67 at center portions, and insulating member 68 is interposed between peripheral edges of lower valve body 66 and upper valve body 67.

Battery holder 13 is described in detail below with reference to FIGS. 1 to 5 again. Battery holder 13 is composed of a curable resin. The curable resin composing battery holder 13 is a resin having such a cross-linked structure as not to melt when exposed to temperatures of 600° C. or higher. When exposed to high temperatures ranging from, for example, 800° C. to 1000° C., such a resin does not melt but carbonizes and keeps the shape of battery holder 13. Specific examples of the resin include thermosetting resins including an unsaturated polyester, an epoxy resin, a melamine resin, and a phenol resin.

The curable resin composing battery holder 13 contains, for example, at least one of an endothermic filler and a thermal conductive filler, and preferably contains both of them. The endothermic filler exhibits an endothermic action during thermal decomposition and specific examples of the endothermic filler include aluminum hydroxide and sodium carbonate. Examples of the thermal conductive filler include metal oxides (for example, aluminum oxide and zinc oxide), metal nitrides (for example, aluminum nitride and boron nitride), and metal oxynitrides (for example, aluminum oxynitride).

Battery holder 13 includes internal space 18 in which cylindrical batteries 12 can be accommodated. Battery holder 13 is also a battery case that accommodates cylindrical batteries 12. Battery holder 13 has a substantially rectangular parallelepiped shape that is longer in the longitudinal and horizontal directions than in the vertical direction. For example, a vertical length of battery holder 13 is slightly longer than an axial length of cylindrical battery 12. A longitudinal length of battery holder 13 is determined based on a length of a column of cylindrical batteries 12 or the like, and a horizontal length of battery holder 13 is determined based on a number of accommodating part groups 30 to be described later or the like.

Recess 23 that accommodates bus bar 41 of positive-electrode current collector plate 14 and recess 28 that accommodates bus bar 46 of negative-electrode current collector plate 15 are formed in battery holder 13. Recess 23 is formed in a front end portion of battery holder 13 whereas recess 28 is formed in a rear end portion of battery holder 13. Recess 23 is formed in a gap between two battery accommodating parts 31 constituting center columns 34 of different accommodating part groups 30 in the front end portion of battery holder 13. Similarly, recess 28 is formed in a gap between two battery accommodating parts 31 constituting center columns 34 of different accommodating part groups 30 in the rear end portion of battery holder 13.

Recess 23 is a hollow formed in a front end portion of upper holder 20, and is formed from an upper end of upper holder 20 to a vertical center portion of upper holder 20. Recess 23 accommodates entire bus bar 41. Screw hole 37 is formed in a lower wall of recess 23. Screw 36 for fixing bus bars 41, 46 is placed in screw hole 37. A distal end portion of bus bar 41 in which through-hole 43 into which screw 36 is inserted is formed is disposed along the lower wall of recess 23 in a manner that through-hole 43 vertically overlaps screw hole 37.

Recess 28 is a hollow formed in rear end portions of upper holder 20 and lower holder 25, and is formed from a lower end of lower holder 25 to the vertical center portion of upper holder 20. Recess 28 is configured by upper-holder-side recess 24 formed in upper holder 20 and lower-holder-side recess 29 formed along a vertical entire length of lower holder 25. Recess 28 accommodates a vertically extending portion of bus bar 46 entirely and a part of a longitudinally extending portion of bus bar 46. A distal end portion of bus bar 46 in which through-hole 48 into which screw 36 is inserted is formed extends from recess 28 to project rearward from the end of battery holder 13.

Recess 23 and recess 28 are formed to vertically overlap with each other. That is, vertical lengths of recesses 23, 28 overlap with each other in the longitudinal direction. When the vertical length of recess 23 is set, recess 28 is formed such that an upper end of recess 28 is positioned above a lower end of recess 23. In battery module 10, an upper portion of recess 28A of battery block 11A and a lower portion of recess 23B of battery block 11B overlap with each other and are opposite to each other in the longitudinal direction. Consequently, a distal end portion of bus bar 46A extending from recess 28A of battery block 11A to project rearward can be inserted into recess 23B of battery block 11B.

In battery module 10, bus bar 46A of battery block 11A extends toward battery block 11B to be connected to bus bar 41B of battery block 11B in recess 23B of battery block 11B. Bus bar 46A of battery block 11A is placed on bus bar 41B such that through-hole 48 vertically overlaps through-hole 43. Screws 36 are then inserted into through-holes 43, 48 and placed in screw holes 37, so that bus bar 41B is electrically connected to bus bar 46A and a connection configuration of battery blocks 11A, 11B is achieved.

Battery holder 13 includes a plurality of battery accommodating parts 31 formed in a staggered manner (zigzag pattern). Battery accommodating part 31 is configured by accommodating part 32 in upper holder 20 and accommodating part 33 in lower holder 25. The upper end portion of cylindrical battery 12 is inserted into accommodating part 32 (first accommodating part) and the lower end portion of cylindrical battery 12 is inserted into accommodating part 33 (second accommodating part). Internal gaps 19 are continuously formed between cylindrical batteries 12 accommodated in battery accommodating parts 31 in battery holder 13.

Battery holder 13 holds only the upper and lower end portions of each cylindrical battery 12 by battery accommodating part 31 (accommodating parts 32, 33) and does not hold a vertical center portion of each cylindrical battery 12. Internal gaps 19 formed between cylindrical batteries 12 are horizontally connected to each other between accommodating part 32 and accommodating part 33 to extend over inside of battery holder 13. That is, internal space 18 (internal gap 19) of battery holder 13 is not defined for each battery accommodating part 31.

Internal gap 19 functions as a heat insulating layer. For example, when one cylindrical battery 12 abnormally generates heat, internal gap 19 functions not to transmit the heat to other batteries. In addition, internal gap 19 is a closed space that is not connected to the outside of battery holder 13 in, for example, the coupling portion of upper holder 20 and lower holder 25. If a part of high-temperature gas discharged from one cylindrical battery 12 enters internal gap 19, a discharge path of gas flowing in internal gap 19 is not formed. That is, high-temperature gas is not blown between cylindrical batteries 12. If a part of gas enters internal gap 19, internal pressure of the holder is increased and thus gas hardly enters any more. Moreover, internal gaps 19 continuously extend in battery holder 13. Even if a part of gas enters internal gap 19, a temperature of battery holder 13 is hardly increased significantly.

Battery holder 13 includes two or more battery accommodating part groups 30 each of which is a group of battery accommodating parts 31 formed in three columns in which cylindrical batteries 12 of adjacent columns are arranged in a staggered manner (zigzag pattern). In the present exemplary embodiment, three accommodating part groups 30 are arranged in the horizontal direction of battery holder 13. Internal gaps 19 are continuous in each accommodating part group 30 to extend over the inside of battery holder 13. A space larger than a space between battery accommodating parts 31 constituting one accommodating part group 30 is formed between accommodating part groups 30. For this reason, internal gap 19 between accommodating part groups 30 is larger than internal gap 19 between battery accommodating parts 31 constituting one accommodating part group 30.

Each accommodating part group 30 is configured such that a number of battery accommodating parts 31 forming center column 34 of three columns of battery accommodating parts 31 is larger than a number of battery accommodating parts 31 forming columns 35 at both ends by one. In the present exemplary embodiment, column 34 is formed by eight battery accommodating parts 31 and column 35 is formed by seven battery accommodating parts 31. Each of columns 34, 35 is formed by arranging battery accommodating parts 31 straight in the longitudinal direction. Battery accommodating parts 31 forming column 34 and battery accommodating parts 31 forming column 35 are arranged in a staggered manner to be shifted from each other by a half pitch in the longitudinal direction.

As described above, battery holder 13 includes upper holder 20 and lower holder 25, and upper holder 20 and lower holder 25 are composed of a curable resin. Upper holder 20 and lower holder 25 are tray-shaped members in which a plurality of accommodating parts 32, 33 for cylindrical batteries 12 are formed. When upper holder 20 is coupled to lower holder 25, accommodating parts 32 and 33 overlap vertically, so that battery accommodating part 31 is formed. For example, a longitudinal length, a horizontal length, and a vertical length of upper holder 20 are substantially equal to those of lower holder 25.

Upper holder 20 includes upper wall 21 that has a substantially rectangular shape in a planar view and side wall 22 formed to be substantially vertical to upper wall 21. A plurality of accommodating parts 32 are formed in an inside of upper holder 20 surrounded by side wall 22. Lower holder 25 includes lower wall 26 that has a substantially rectangular shape in a planar view and side wall 27 formed to be substantially vertical to lower wall 26. A plurality of accommodating parts 33 are formed in an inside of lower holder 25 surrounded by side wall 27.

Coupling parts 38 are formed on side walls of upper holder 20 and lower holder 25. For example, upper holder 20 is placed on lower holder 25 in which the lower end portion of each cylindrical battery 12 is inserted into each accommodating part 33 and these holders are screwed at coupling parts 38, so that battery holder 13 in which cylindrical batteries 12 are accommodated is formed. Opening 32c of upper wall 21 is closed by first end surface 12a of cylindrical battery 12 and opening 33c of lower wall 26 is closed by second end surface 12b of cylindrical battery 12. Distal end portions of side walls 22, 27 abut to each other without any gaps. Internal gap 19 is thus a closed space.

Figure 7:
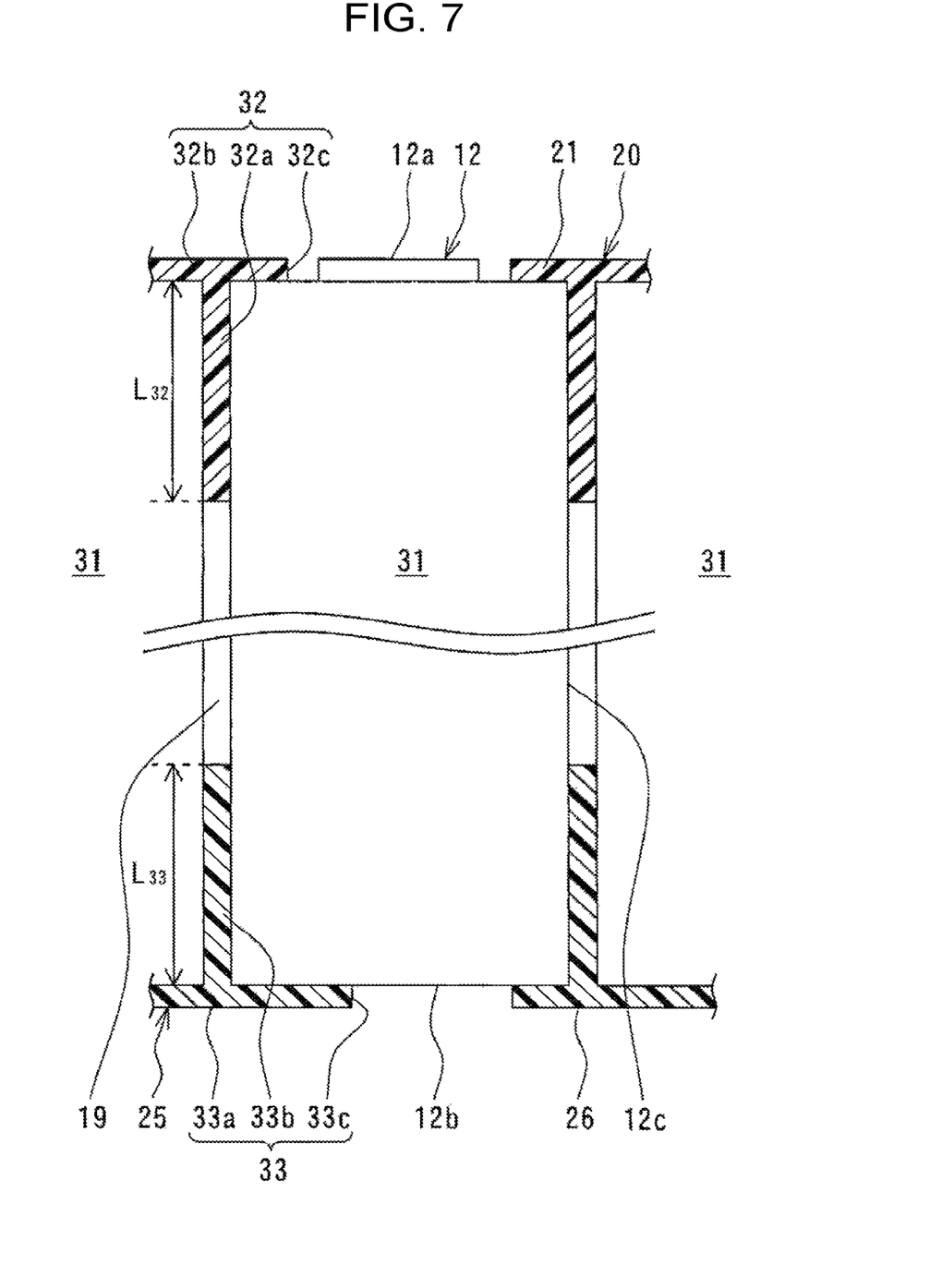
FIG. 7 is an enlarged cross-sectional view of upper and lower end portions of a battery accommodating part of a battery holder according to the example of the exemplary embodiment.

FIG. 7 is an enlarged cross-sectional view of upper and lower end portions of battery accommodating part 31. As exemplified in FIG. 7 (see also FIGS. 4 and 5), each accommodating part 32 in upper holder 20 includes partition wall 32a (first partition wall) formed along outer peripheral surface 12c of cylindrical battery 12 and extending portion 32b (first extending portion) formed integrally with partition wall 32a. Extending portion 32b extends on first end surface 12a so as to surround a part of first end surface 12a on which safety valve 50 is disposed. In addition, each accommodating part 32 includes opening 32c (first opening) for exposing the part of first end surface 12a on which safety valve 50 is disposed.

Accommodating part 32 is a cylindrical recess having an upper end partially closed by extending portion 32b, and holds the upper end portion of cylindrical battery 12. Opening 32c is a through-hole formed in upper wall 21, and extending portion 32b is formed by a part of upper wall 21 around opening 32c. Positive-electrode lead plate 16 of terminal plate 4 is connected via opening 32c to first end surface 12a. When safety valve 50 of cylindrical battery 12 breaks and gas is discharged, the gas is discharged through opening 32c. Openings 32c each have, for example, a circular shape and are formed in a staggered manner.

Partition wall 32a is formed to be close to outer peripheral surface 12c of cylindrical battery 12 and may contact outer peripheral surface 12c. Extending portion 32b is disposed to be opposite to a peripheral edge of an outer surface of first end surface 12a around opening 32c. Extending portion 32b is formed to be close to the outer surface of first end surface 12a, and may contact the outer surface of first end surface 12a. The upper end portion of cylindrical battery 12 is surrounded by accommodating part 32 as described above, and thus gas discharged when safety valve 50 breaks hardly flows into battery holder 13. That is, the gas is prevented from flowing by an increase in inflow resistance due to partition wall 32a and extending portion 32b.

While preferable vertical length $L_{32}$ of partition wall 32a varies depending on capacity, output, and type of cylindrical battery 12 and the like, for example, vertical length $L_{32}$ is 3% to 30%, 5% to 25%, or 10% to 25% of the axial length of cylindrical battery 12. That is, upper holder 20 surrounds outer peripheral surface 12c of cylindrical battery 12 by a length in a range of 3% to 30% of the axial length of cylindrical battery 12 from an upper end of outer peripheral surface 12c of cylindrical battery 12. As vertical length $L_{32}$ is approximately 3% to 30% of the axial length of cylindrical battery 12, it is possible to efficiently prevent the gas from flowing into a holder while achieving weight-reduction of battery holder 13, material cost reduction, and the like. For example, vertical lengths $L_{32}$ of partition walls 32a are equal to each other.

Terminal plate 4 is attached on upper wall 21 of upper holder 20 so as to be brought into close contact with upper wall 21. Consequently, no gap for enabling the gas to easily flow is present between terminal plate 4 and battery holder 13. In the present exemplary embodiment, base 40 of positive-electrode current collector plate 14 to which positive-electrode lead plate 16 is bonded is screwed to upper wall 21. A screw hole (not shown) into which screw 36 for fixing terminal plate 4 is inserted is formed in upper wall 21.

Each accommodating part 33 in lower holder 25 includes partition wall 33a (second partition wall) formed along outer peripheral surface 12c of cylindrical battery 12 and extending portion 33b (second extending portion) that extends on second end surface 12b and that is formed integrally with partition wall 33a. In addition, each accommodating part 33 includes opening 33c (second opening) for exposing a part of second end surface 12b. When a safety valve is disposed on second end surface 12b, extending portion 33b extends on second end surface 12b so as to surround a part of second end surface 12b on which the safety valve is disposed, and opening 33c is formed to expose the part of second end surface 12b on which the safety valve is disposed.

Accommodating part 33 is a cylindrical recess having a lower end partially closed by extending portion 33b, and holds the lower end portion of cylindrical battery 12. Opening 33c is a through-hole formed in lower wall 26, and extending portion 33b is formed by a part of upper wall 26 around opening 33c. Negative-electrode lead plate 17 of terminal plate 5 is connected via opening 33c to second end surface 12b. Openings 33c each have, for example, a substantially semicircular shape and are formed in a staggered manner.

Partition wall 33a is formed to be close to outer peripheral surface 12c of cylindrical battery 12 and may be brought into contact with outer peripheral surface 12c. Extending portion 33b is disposed to be opposite to a peripheral edge of an outer surface of second end surface 12b around opening 33c. Extending portion 33b is formed to be close to the outer surface of second end surface 12b, and may be brought into contact with the outer surface of second end surface 12b. The lower end portion of cylindrical battery 12 is surrounded by accommodating part 33 as described above, and thus gas discharged when a safety valve breaks hardly flows into battery holder 13 from below.

While preferable vertical length $L_{33}$ of partition wall 33a varies depending on the capacity, output, and type of cylindrical battery 12 and the like as in a case of accommodating part 32, for example, vertical length $L_{33}$ is 3% to 30%, 5% to 25%, or 10% to 25% of the axial length of cylindrical battery 12. In the present exemplary embodiment, vertical lengths of partition walls 32a, 33a are equal to each other. Lower holder 25 surrounds outer peripheral surface 12c of cylindrical battery 12 by a length in a range of 3% to 30% of the axial length of cylindrical battery 12 from the lower end of outer peripheral surface 12c of cylindrical battery 12.

Terminal plate 5 is attached on lower wall 26 of lower holder 25 so as to be brought into close contact with lower wall 26. Consequently, no gap for enabling the gas to easily flow is present between terminal plate 5 and battery holder 13. In the present exemplary embodiment, base 45 of negative-electrode current collector plate 15 to which negative-electrode lead plate 17 is bonded is screwed to lower wall 26. A screw hole (not shown) into which screw 36 for fixing terminal plate 5 is inserted is formed in lower wall 26.

As described above, in battery block 11, terminal plates 4, 5 are respectively attached on the upper and lower walls of battery holder 13 so as to be brought into close contact with the upper and lower walls, and battery holder 13 surrounds the upper and lower end portions of cylindrical battery 12. Consequently, even if abnormality occurs in one cylindrical battery 12 and high-temperature gas is discharged from that cylindrical battery 12, the shape of battery holder 13 composed of a curable resin is kept and the gas is prevented from flowing into the holder. That is, battery block 11 prevents high-temperature gas from being blown between cylindrical batteries 12 and sufficiently reduces influence on other normal batteries.

A design of the exemplary embodiment described above may be appropriately changed without impairing the object of the present disclosure. For example, when a safety valve is disposed on only a first end surface of each cylindrical battery, only a first holder may extend on the first end surface so as to surround a part of the first end surface on which the safety valve is disposed and a second holder may not extend on a second end surface of each cylindrical battery. In addition, an internal gap (an internal space) of a battery holder may be defined for each accommodating part group, and three or more columns of battery accommodating parts may be formed in the horizontal direction of the battery holder at fixed intervals.

REFERENCE MARKS IN THE DRAWINGS 4, 5: terminal plate
10: battery module
11, 11A, 11B: battery block
12: cylindrical battery
12a: first end surface
12b: second end surface
12c: outer peripheral surface
13, 13A, 13B: battery holder
14, 14B: positive-electrode current collector plate
15, 15A: negative-electrode current collector plate
16: positive-electrode lead plate
17: negative-electrode lead plate
18: internal space
19: internal gap
20: upper holder (first holder)
21: upper wall
22, 27: side wall
23, 23B: recess
24: upper-holder-side recess
25: lower holder (second holder)
26: lower wall
28, 28A: recess
29: lower-holder-side recess
30: accommodating part group
31: battery accommodating part
32, 33: accommodating part
32a, 33a: partition wall
32b, 33b: extending portion
32c, 33c: opening
34, 35: column
36: screw
37: screw hole
38: coupling part
40, 45: base
41, 41B, 46, 46A: bus bar
42, 47: opening
43, 48: through-hole
50: safety valve
51: positive electrode
52: negative electrode
53: separator
54: electrode assembly
55: case
56: case main body
57: sealing body
58: gasket
59, 60: insulating plate
61: positive electrode tab
62: negative electrode tab
63: filter
63a, 64a: opening
64: cap
65: extending portion
66: lower valve body
67: upper valve body
68: insulating member

The invention claimed is:

1. A battery block comprising:
a plurality of cylindrical batteries where a safety valve is disposed on a first end surface on a side of an axial one end portion of each of the cylindrical batteries; and
a battery holder that is configured by coupling a first holder to a second holder, wherein
the first holder is composed of a resin and has a plurality of accommodating parts into which the axial one end portions of the cylindrical batteries are inserted, and
the second holder is composed of a resin and has a plurality of accommodating parts into which axial other end portions of the cylindrical batteries are inserted,
wherein each of the accommodating parts of the first holder includes a first partition wall formed along an outer peripheral surface of each of the cylindrical batteries, each of the accommodating parts of the second holder includes a second partition wall formed along an outer peripheral surface of each of the cylindrical batteries, and an internal gap is formed between the cylindrical batteries inside of the battery holder, and in the internal gap, the first partition wall is not formed in an axial direction of each of the cylindrical batteries inside of the first holder and the second partition wall is not formed in an axial direction of each of the cylindrical batteries inside of the second holder, and
wherein the internal gap is a closed space that is not connected to an outside of the battery holder in a coupling portion of the first holder and the second holder.

2. The battery block according to claim 1, wherein each of the first holder and the second holder includes side wall surrounding the plurality of accommodating parts.

3. The battery block according to claim 1, wherein the side wall of the first holder overlaps the side wall of the second holder in the direction where the plurality of cylindrical batteries are aligned.

* * * * *